United States Patent [19]

Sunohara et al.

[11] 4,325,096

[45] Apr. 13, 1982

[54] ZERO-PHASE CURRENT TRANSFORMER

[75] Inventors: Mineo Sunohara; Yasuhiko Okubo, both of Sagamihara; Mitsugu Taketa, Itami; Yoshiyuki Nakai, Itami; Yukio Miyazaki, Itami, all of Japan

[73] Assignee: Mitsubishi Denki Kabushiki Kaisha, Tokyo, Japan

[21] Appl. No.: 108,245

[22] Filed: Dec. 27, 1979

[30] Foreign Application Priority Data

Dec. 29, 1978 [JP] Japan ................................ 53/164282

[51] Int. Cl.³ ......................... H02H 3/28; H01F 40/06

[52] U.S. Cl. ......................................... 361/45; 336/83; 336/100; 336/174; 336/212

[58] Field of Search ............... 336/174, 175, 173, 212, 336/233, 234, 83, 100, 165; 361/44, 45, 46

[56] References Cited

U.S. PATENT DOCUMENTS

| | | | |
|---|---|---|---|
| 1,736,994 | 11/1929 | Clayton et al. | 336/174 X |
| 1,880,805 | 10/1932 | Christopher | 336/234 |
| 3,170,133 | 2/1965 | Kernick | 336/165 |
| 3,315,087 | 4/1967 | Ingenito | 336/233 |
| 3,739,255 | 6/1973 | Leppent | 336/212 X |
| 3,748,618 | 7/1973 | Kaiserswerth et al. | 336/233 X |
| 3,781,740 | 12/1973 | Kirmis et al. | 336/233 X |

FOREIGN PATENT DOCUMENTS

| | | |
|---|---|---|
| 40-14061 | 7/1965 | Japan . |
| 40-16294 | 7/1965 | Japan . |

*Primary Examiner*—Thomas J. Kozma
*Attorney, Agent, or Firm*—Sughrue, Mion, Zinn, Macpeak & Seas

[57] ABSTRACT

A zero-phase current transformer for use as a leakage current detecting element in a leakage current interrupter in which two magnetic materials of different permeabilities are provided so as to eliminate a range where the leakage current interrupter is inoperable without lowering its ability to distinguish noise components. The different magnetic materials may be provided as a single core constructed by mixing the materials of different permeabilities. Otherwise, the materials can be provided as annually-shaped magnetic pieces stacked one on top of the other. Still further, the materials of different magnetic permeability may be provided as bands of materials interwound to form alternating layers or one of the materials may be provided as at least a portion of a protective case.

2 Claims, 20 Drawing Figures

ZERO-PHASE CURRENT TRANSFORMER

BACKGROUND OF THE INVENTION

The present invention relates to a zero-phase current transformer (hereinafter referred merely to ZCT when applicable) for use as a leakage current detecting element in a leakage current interrupter.

In FIG. 1 is a schematic diagram including a partially cross-sectional view illustrating an example of conventional ZCT. In FIG. 1, reference numeral 1 designates a circular magnetic core made of magnetic material; reference numeral 2, a damper member such as silicon grease for protecting the magnetic core 1 from impact directly applied thereto; reference numeral 3, a protective case for protecting the magnetic core 1 from an inward pressure caused by a secondary winding 4 wound around the peripheral surface thereof; and reference numeral 5 designates the ZCT generally including the above described components. After providing the secondary winding 4 over the protective case, either a winding of a tape with lead lines or an additional protective case is further provided around the secondary winding 4 to provide further protection to the winding 4. As the present invention specifically relates to the construction of the magnetic core 1 in the ZCT 5, a description and illustration of the protective means for the secondary winding 4 will be omitted.

In the conventional ZCT, magnetic materials such as Supermalloy (Trademark, the material itself is defined by JIS C 2531) having a high magnetic permeability are used as the magnetic core 1. The magnetic core 1 may be constructed by either, as shown in FIG. 1, piling annular magnetic core materials shaped from discs by piercing or, as shown in FIG. 2, spirally winding a ribbon-shaped magnetic core material.

FIGS. 3A and 3B are explanatory diagrams for describing an operation principle. FIG. 3A shows a circuit diagram of a commonly-used circuit employing such a transformer while FIG. 3B shows an equivalent circuit thereof. In FIG. 3A and FIG. 3B, reference numeral 10 designates a load lead line. Two load lead lines in the case of single phase current or three load lead lines in the case of three phase current extend through the center of the ZCT 5 or are wound around the ZCT 5. Reference numeral 11 designates a relay device which operates in response to the output from the secondary winding 4 of the ZCT 5 while reference character $I_L$ designates a load current; reference character $I_0$, a leakage current (zero-phase current) which flows to ground representing leakage current; reference character $\Phi$, magnetic flux generated in the magnetic core 1 of the ZCT 5 upon the presence of leakage current $I_0$, and reference character $V_2$, a secondary output voltage appearing between both terminals of the secondary winding 2, which is obtained by differentiating the magnetic flux with respect to time.

FIG. 4A is a hysteresis loop diagram showing the variation of the magnetic flux with respect to the leakage current $I_0$. FIG. 4B is a graphical representation showing several different leakage current waveforms $I_0$, wherein suffixes a, b and c represent small, medium and large leakage currents, respectively. FIG. 4C is a graphical representation showing the variations of magnetic flux generated by the leakage current $I_0$ wherein, for example, a magnetic flux generated in response to the small leakage current $I_{0a}$ is designated by $\Phi_a$, etc. FIG. 4D is a graphical representatation showing the variation of a secondary output voltage appearing between the two terminals of the secondary winding 2 upon the presence of a leakage current $I_0$.

When the leakage current is small as indicated by reference character $I_{0a}$ in FIG. 4B, the magnetic flux generated in the magnetic core 1 in response to the leakage current $I_{0a}$ varies as indicated by $\Phi_a$ in FIG. 4C. As a result, the secondary output voltage $V_{2a}$ varies as shown in FIG. 4D. As is clear from FIG. 4D, the duration $t_a$ of the secondary output voltage $V_{2a}$ is sufficient to detect a leak. In contrast, in the case when the leakage current is larger as indicated by $I_{0b}$ or $I_{0c}$ (this condition is called excessive leakage), the magnetic flux $\Phi_b$ or $\Phi_c$ generated in the magnetic core 1 becomes partially saturated and therefore the secondary output voltages $V_{2b}$ or $V_{2c}$ exhibit a pulse-like waveform as shown in FIG. 4D. Accordingly, the duration $t_b$ to $t_c$ becomes smaller than that of $t_a$.

In one prior art technique, a larger sinewave current such as $I_{0d}$ shown in FIG. 5A was superimposed on the actual leakage current. The resulting flux in the core then has a waveform as shown in FIG. 5B.

In this case, provided that a leakage current $I_{0d}$ larger than $I_{0c}$, due to magnetic permeability of the atmosphere, the saturation state of the magnetic flux passing through the secondary winding is broken. As a result, a sinewave output appears at the secondary output terminals and the pulse-like output such as $V_{2c}$ generated when the magnetic core is magnetically saturated is superimposed on the sinewave output thereby resulting in an occurrence of output $V_{2d}$ as shown in FIG. 5C.

Generally, in a leakage current interrupter, a relay device which is actuated in response to the secondary output voltage $V_2$ of the leakage current detecting element such as a ZCT is so designed that, in order to distinguish a leakage current from a noise signal, the relay device operates only when the secondary output voltage $V_2$ is higher than a predetermined threshold voltage level $V_{20}$ and further the duration of the secondary output voltage $V_2$ is larger than a predetermined threshold duration level $t_0$. FIG. 6 is a graphical representation showing the leakage current $I_0$ on the horizontal axis and the duration of a secondary output voltage on the vertical axis in the case where the condition that the secondary output voltage $V_2$ be higher than the predetermined threshold voltage level $V_{20}$ is satisfied.

As is clear from FIG. 6, while the secondary output voltage $V_2$ is higher than the predetermined threshold voltage level $V_{20}$, there is a possibility that the duration t of the secondary output voltage $V_2$ may be smaller than the predetermined threshold duration level $t_0$, for example, in the range of the leakage current magnitude indicated by reference character E. Accordingly, even if leakage occurs, there is a possibility that the relay device 11 may not operate thereby resulting in there being no operation of the leakage current interrupter.

SUMMARY OF THE INVENTION

In view of the above described drawbacks, an object of the present invention is to provide a ZCT capable of eliminating the drawbacks accompanying the conventional ones.

These and other objects of this invention are accomplished by the provision of a ZCT whose magnetic core is constructed with a combination of high magnetic permeability magnetic materials and low magnetic permeability magnetic materials whereby the magnetic saturation state in the magnetic core can be retarded and the pulse duration of secondary output voltage can be prevented from being shortened.

DESCRIPTION OF THE PREFERRED EMBODIMENTS

Figure 1:
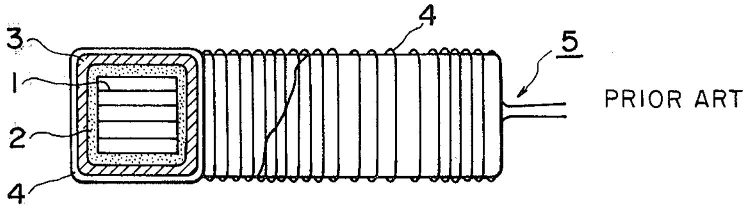
FIG. 1 is a schematic diagram including a partially cross-sectional view illustrating a schematic construction of a conventional zero-phase current transformer (ZCT)
Figure 2:
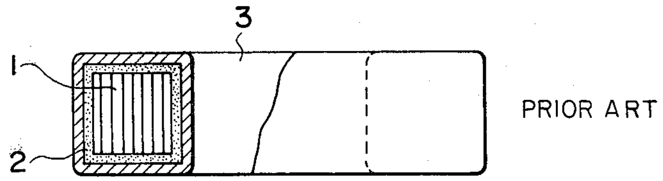
FIG. 2 is a schematic diagram illustrating a schematic construction of another example of a magnetic core.
Figure 3A:
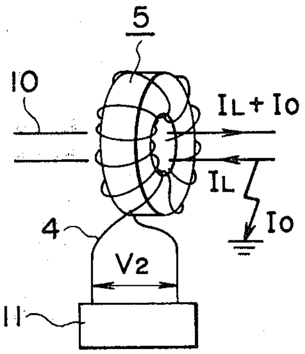
FIG. 3A PRIOR ART
FIG. 3A is an explanatory diagram showing a commonly used circuit.
Figure 3B:
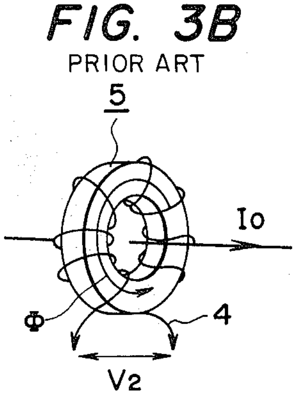
FIG. 3B PRIOR ART
FIG. 3B is an explanatory diagram showing an equivalent circuit of the circuit shown in FIG. 3B.
Figure 4A:
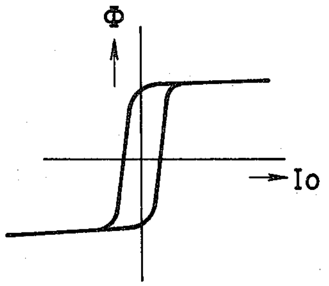
FIG. 4A PRIOR ART
FIG. 4A is a graphical representation showing a hysteresis loop of the conventional magnetic core.
Figure 4C:
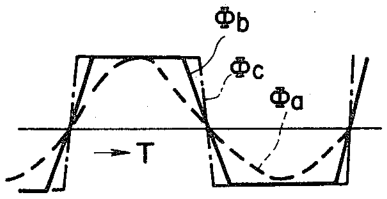
FIG. 4C PRIOR ART
FIGS. 4B to 4D are graphical representations showing variations of a leakage current $I_0$, a magnetic flux $\Phi$ and a secondary output voltage $V_2$ with respect to time T.
Figure 4B:
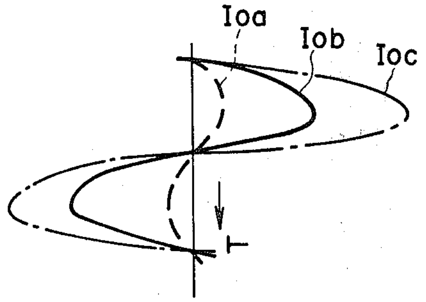
FIG. 4B PRIOR ART
Figure 4D:
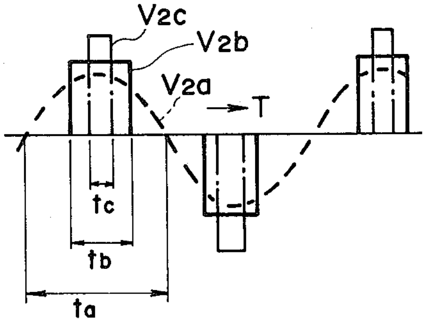
FIG. 4D PRIOR ART
Figure 7:
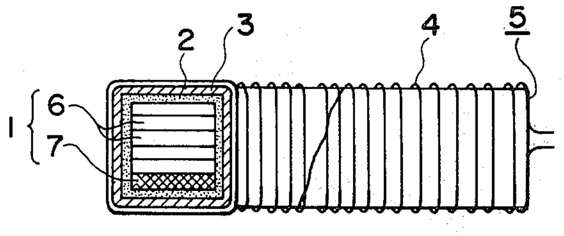
FIG. 7 is a schematic view illustrating a ZCT according to the present invention.

A preferred embodiment of the present invention will be described with reference to FIGS. 7 to 10. FIG. 7 is a schematic diagram illustrating a schematic construction of an embodiment of ZCT constructed according to the present invention wherein the elements common to those of FIG. 1 bear the same reference numerals and therefore detailed explanation as to these elements is omitted. The present invention is characterized by the construction of a combined magnetic core 1 which is constructed by combining magnetic core materials having a high magnetic permeability and magnetic core materials having a low magnetic permeability.

Figure 8:
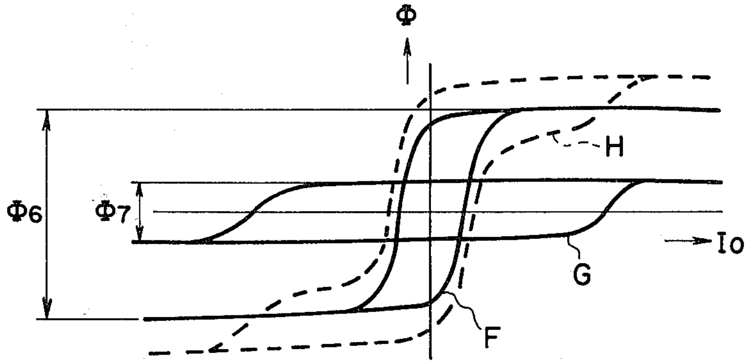
FIG. 8 is a graphical representation showing a hysteresis loop of the magnetic core according to the invention.

FIG. 8 is a graphical representation showing a magnetic characteristic of the combined magnetic core shown in FIG. 7 where reference character F designates a hysteresis loop of the conventional magnetic core made of high magnetic permeability material and reference character G designates a hysteresis loop of a magnetic core made of low magnetic permeability material. The combined magnetic core according to the present invention exhibits a hysteresis loop designated by reference character H. The hysteresis loop H may be obtained by superimposing the hysteresis loop G on the hysteresis loop F. The shape of the hysteresis loop H and magnetizing force prior to saturation are controlled by suitably selecting magnetic materials for use as the low magnetic permeability magnetic material 7 and varying the cross-sectional area ratio of the magnetic core materials 6 and 7. Specifically, a material formed of cold rolled carbon steel sheet, pure iron, silicon steel, and permalloy can be employed as the material 7. Further, the finally shaped materials may be subjected to one or more thermal treatments.

Figure 6:
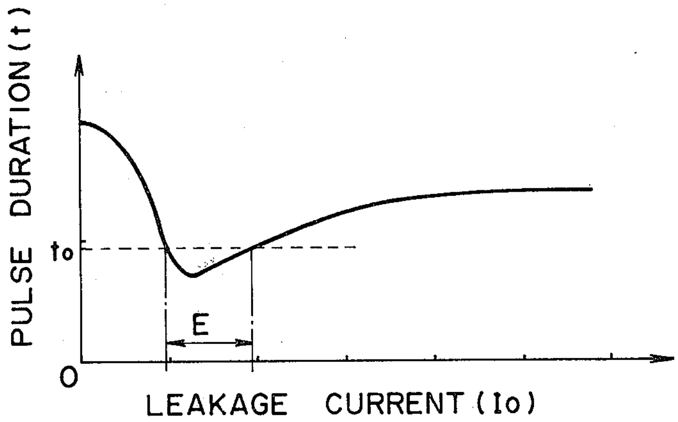
PRIOR ART FIG. 6
FIG. 6 is an explanatory diagram showing the relationship between the leakage current $I_0$ of the ZCT and the pulse duration of the secondary output voltage.
Figure 5A:
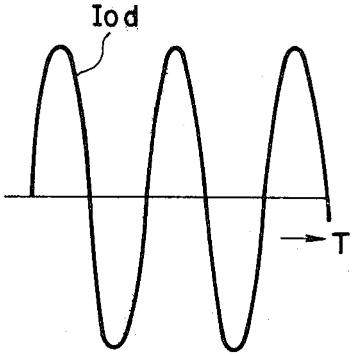
FIG. 5A PRIOR ART
FIGS. 5A to 5C are graphical representations showing variations of a leakage current $I_{0d}$, a magnetic flux $\Phi_d$ and a secondary output voltage $V_{2d}$ with respect to time T.
Figure 5B:
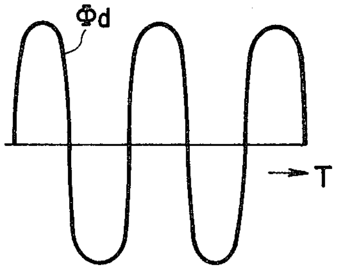
FIG. 5B PRIOR ART
Figure 5C:
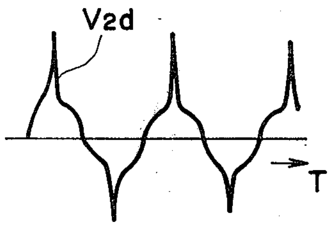
FIG. 5C PRIOR ART
Figure 9A:
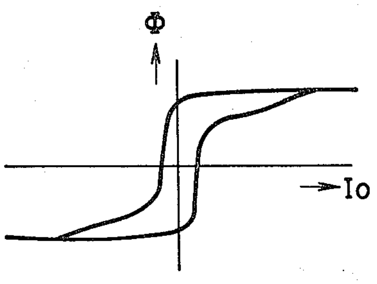
FIGS. 9A to 9D are graphical representation showing characteristics of an example of a ZCT according to the invention.
Figure 9C:
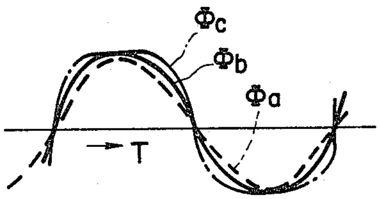
Figure 9B:
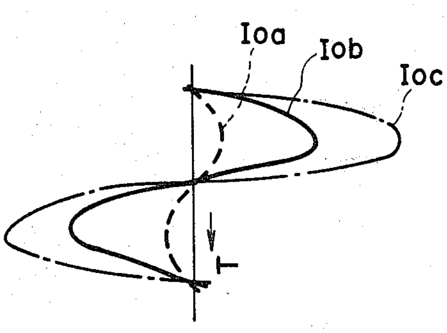
Figure 9D:
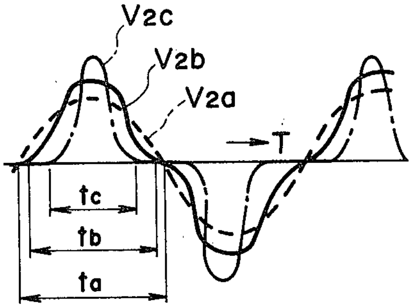
Figure 10:
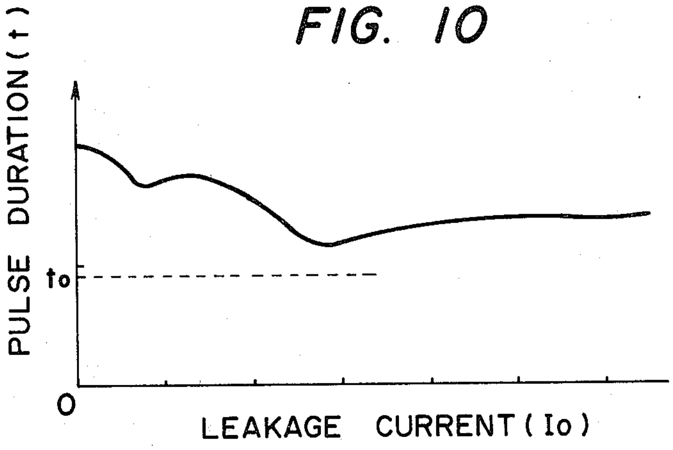
FIG. 10 is an explanatory diagram showing the relationship between the leakage current $I_0$ and the pulse duration of the secondary output voltage of the ZCT according to the invention.

FIGS. 9A and 9D are graphical representations showing the relationships among $I_0$, $\Phi$, $V_2$ and t generated in a ZCT including the combined magnetic core according to the present invention. These graphs are similar in what is represented therein to FIGS. 4A to 4D. Comparing FIGS. 9A to 9D with FIGS. 4A to 4D, it is apparent that the magnetic flux $\Phi_a$, $\Phi_b$ or $\Phi_c$ in the ZCT is but little saturated while the pulse duration $t_c$ of the secondary output voltage $V_2$ is considerably lengthened. FIG. 10 is an explanatory diagram similar to FIG. 6. As is apparent from FIG. 10, the shortest pulse duration of the secondary output $V_2$ is larger than the predetermined pulse duration $T_0$. Therefore, according to this invention, it is possible to eliminate the range where the leakage current interrupter is not operable even when leakage occurs without lowering the distinguishability with respect to noise components.

Samples of a conventional ZCT and a ZCT according to the present invention were compared with the following results.

1. Conventional ZCT

The magnetic core was formed by stacking five annularly-shaped pieces of supermalloy magnetic material having a high magnetic permeability. The materials was made of Ni: approximately 80%, Mo: approximately 5%, Fe: balance, had a size of 13 (outside diam.)×9 (inside diam.)×0.35 (thickness) mm, and had a secondary winding wound around the magnetic core with 1000 turns.

2. ZCT According to the Present Invention

The magnetic core was formed by stacking five annularly-shaped pieces of Supermalloy magnetic material together with one annularly-shaped piece of magnetic material of cold rolled carbon steel sheet containing C: less than 0.12%; Mn: less than 0.50%; P: less than 0.04%; S: less than 0.045%; Fe: balance, having a low magnetic permeability, whose size was 13(O.D.)×9(I.D.)×0.35 mm, and which had a secondary winding wound around the magnetic core with 1000 turns.

In both test samples, a single-turn primary winding was wound around the magnetic core and either a resistor of 1KΩ or a resistor of 3KΩ was connected between the terminals of the secondary winding. Under these conditions, the pulse duration t in msec. of a secondary output voltage appearing between the both ends of the resistor was measured while the leakage current (the primary current) was varied from 10A to 40A. The measurement results are shown in Table 1 following.

TABLE 1

| Sort | Resistance (Ω) | $I_0$ (A) 10 | 20 | 30 | 40 |
|---|---|---|---|---|---|
| (1) Conventional | 1 K | 4.2 | 3.2 | 2.8 | 2.6 |
| | 3 K | 4.4 | 3.5 | 3.0 | 2.7 |

TABLE 1-continued

| | Resistance | $I_0$ (A) | | | |
|---|---|---|---|---|---|
| Sort | (Ω) | 10 | 20 | 30 | 40 |
| ZCT (2) | 1 K | 8.1 | 8.2 | 8.4 | 8.4 |
| ZCT of this invention | 3 K | 8.1 | 8.6 | 8.6 | 8.5 |

As is clear from the above table, the pulse duration of the secondary output voltage generated by the ZCT according to the invention is more than twice that generated by the conventional ZCT.

While in the above test samples, Supermalloy was used as the high magnetic permeability magnetic material, ferrite having a high magnetic permeability, specifically, amorphous ferrite or the like which is generally used as a magnetic core material of ZCT may be used instead of the Supermalloy. For the soft magnetic materials, materials such as silicon steel, pure iron, ferrite or the like may be used instead of a cold rolled carbon steel sheet. Further, magnetic core materials whose constituent components are identical to those of the high magnetic permeability magnetic but which has been subjected to one or more thermal treatments to shift the magnetic permeability thereof to a low magnetic permeability can be used for the magnetic core materials having a low magnetic permeability.

Figure 11:
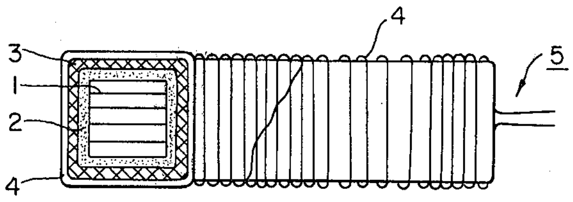
FIG. 11. is an illustration of a ZCT according to a further embodiment of the present invention wherein the core and protective case are made of different permeability materials.

Furthermore, while in the above test sample, a plurality of annularly-shaped high magnetic permeability materials were stacked on annularly-shaped pieces of low magnetic permeability material, the invention is not restricted to such a magnetic core construction. Specifically, the two kinds of magnetic materials may be mixed to form the magnetic core. The main body or the lid or at least some portion of the protective case for the magnetic core 1 may be made of low magnetic permeability materials instead of the low permeability core material 7 or the core may be made of low permeability material and at least part of the protective case high permeability material as shown in FIG. 11. Yet further, the magnetic core may be constructed by placing a band of low permeability material against a band of high permeability material and winding the two into a core of desired dimensions so that, in cross section once wound, the core will have alternating layers of high and low permeability material.

What is claimed is:

1. A zero-phase current transformer comprising:

a magnetic core comprising a first magnetic material having a high magnetic permeability;

a damper member for protecting said magnetic core from an impact directly applied thereto;

a secondary winding wound around the peripheral surface of said damper member, said secondary winding being coupled to a relay means operable in response to an output of said secondary winding above a predetermined level;

casing means for protecting said magnetic core from an inward pressure caused by said secondary winding, at least a portion of said casing means comprising a second magnetic material having a magnetic permeability lower than that of said first magnetic material; and a load lead wire magnetically coupled to said magnetic core for supplying an electric current to a load.

2. A zero-phase current transformer comprising:

a magnetic core comprising a first magnetic material having a relatively low magnetic permeability;

a damper member for protecting said magnetic core from an impact directly applied thereto;

a secondary winding wound around the peripheral surface of said damper member, said secondary winding being coupled to a relay means operable in response to an output of said secondary winding above a predetermined level;

a casing means for protecting said magnetic core from an inward pressure caused by said secondary winding, at least a portion of said casing means comprising a second magnetic material having a magnetic permeability higher than that of said first magnetic material; and a load lead wire magnetically coupled to said magnetic core for supplying an electric current to a load.

* * * * *